United States Patent
Loh

(10) Patent No.: US 11,834,274 B2
(45) Date of Patent: Dec. 5, 2023

(54) CONVEYOR SYSTEM HAVING A GUIDE MEMBER, AND USE OF A GUIDE MEMBER

(71) Applicant: Deutsche Post AG, Bonn (DE)

(72) Inventor: Hillar Loh, Niederkassel (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 17/939,266

(22) Filed: Sep. 7, 2022

(65) Prior Publication Data
US 2023/0072485 A1    Mar. 9, 2023

(30) Foreign Application Priority Data
Sep. 7, 2021 (DE) .................. 10 2021 123 134.5

(51) Int. Cl.
*B65G 21/20* (2006.01)

(52) U.S. Cl.
CPC .................. *B65G 21/2072* (2013.01)

(58) Field of Classification Search
CPC ............ B65G 21/2072; B65G 21/2045; B65G 21/2054; B65G 21/2063; B65G 21/2081
See application file for complete search history.

(56) References Cited

U.S. PATENT DOCUMENTS

| | | | | |
|---|---|---|---|---|
| 4,958,725 A | * | 9/1990 | Meade | B65G 21/2072 198/836.1 |
| 4,989,722 A | * | 2/1991 | Kuepper | B65H 67/06 198/476.1 |
| 5,311,979 A | * | 5/1994 | Risley | B65G 51/03 198/689.1 |
| 5,513,743 A | * | 5/1996 | Brink | B65G 21/2081 198/836.1 |
| 7,073,661 B2 | * | 7/2006 | Wilmo | B65G 15/42 198/841 |
| 8,033,386 B2 | * | 10/2011 | Roseberry | B65G 21/2081 198/836.3 |

(Continued)

FOREIGN PATENT DOCUMENTS

| | | |
|---|---|---|
| DE | 4437831 | 4/1996 |
| DE | 10 2009 027 280 | 3/2011 |

(Continued)

OTHER PUBLICATIONS

"Patent Translate Description FR298678" EPO (Year: 2023).*

(Continued)

*Primary Examiner* — Mark A Deuble
(74) *Attorney, Agent, or Firm* — Dority & Manning, PA

(57) ABSTRACT

A conveyor system includes a conveyor device for transporting a piece goods item along a transport direction, and at least one guide member which has a base area and a first, planar lateral face, wherein the conveyor device has a conveyor surface for the piece goods item, and a lateral peripheral region which in the transport direction is disposed so as to be lateral to the conveyor surface, wherein the first lateral face conjointly with the base area configures an internal angle of intersection of less than 90 degrees, and wherein the guide member is disposed and/or designed in such a manner that at least part of the base area thereof is on the lateral peripheral region, and that a normal vector of the first lateral face, counter to the transport direction, points obliquely toward a center of the conveyor surface.

14 Claims, 2 Drawing Sheets

(56) References Cited

U.S. PATENT DOCUMENTS

| | | | |
|---|---|---|---|
| 8,096,410 B2* | 1/2012 | Kalm | B65G 15/60 |
| | | | 198/840 |
| 10,753,785 B2* | 8/2020 | Merz | B65G 47/28 |
| 11,332,319 B2* | 5/2022 | Bernhardt | A21C 3/00 |
| 2022/0306394 A1* | 9/2022 | Morgner | B65G 21/2081 |

FOREIGN PATENT DOCUMENTS

| | | |
|---|---|---|
| ES | 2651134 A1 | 1/2018 |
| FR | 2986788 A1 | 8/2013 |
| GB | 2490505 A | 11/2012 |
| JP | 2018-48 012 | 3/2018 |

OTHER PUBLICATIONS

European Search Report for corresponding European Application No. EP 22193464.9, dated Feb. 10, 2023, 13 pages.

German Office Action (w/ English translation) for corresponding DE Application No. 10 2021 123 134.5, dated May 6, 2022, 14 pages.

\* cited by examiner

CONVEYOR SYSTEM HAVING A GUIDE MEMBER, AND USE OF A GUIDE MEMBER

CROSS-REFERENCE TO RELATED APPLICATIONS

This application is based upon and claims the right of priority to German Patent Application No. 102021123134.5, filed on Sep. 7, 2021, the disclosure of which is hereby incorporated by reference in its entirety for all purposes.

TECHNICAL FIELD

The invention relates to a conveyor system comprising a conveyor device for transporting a piece goods item along a transport direction, and at least one guide member which has a base area and a first, in particular planar, lateral face.

Moreover, the invention relates to the use of a guide member in a conveyor device for displacing a piece goods item, which by the conveyor device on a conveyor surface is transported along a transport direction, toward a center of the conveyor surface.

BACKGROUND TO THE INVENTION

Conveyor devices for transporting a piece goods item along a transport direction, such as belt conveyors, for example, are known in the prior art. A set of issues in the case of conveyor devices lies in that piece goods that are transported by the conveyor device can fall off the conveyor device. This is typically addressed by lateral guides which are intended to prevent the piece goods item falling off. However, said lateral guides have the disadvantage that access to the piece goods transported by the conveyor device is hampered. Moreover, lateral guides are expensive and require installation space.

Moreover, in particular in the case of conveyor devices which have a conveyor surface for the piece goods item and a lateral peripheral region that in the transport direction is disposed so as to be lateral to the conveyor surface, situations can arise in which piece goods fall off the conveyor device—despite potentially existing lateral guides. For example, in some belt conveyors the conveyor surface, which is designed as a belt, is narrower than a machine base such that a lateral peripheral region which is not swept by the belt remains laterally beside the belt. When transporting piece goods by the conveyor device it can arise that piece goods come to lie completely or partially in the lateral peripheral region and in this way contribute toward the piece goods backing up on the conveyor device. As a result of the continuously running belt and/or by virtue of the following piece goods, the piece goods can be displaced and/or pile up and in this way fall off the conveyor device.

DESCRIPTION OF THE INVENTION

Proceeding from this situation it is an object of the present invention to provide means which minimize the risk of piece goods falling off a conveyor device. It is moreover an object of the invention to provide means which minimize the risk of the piece goods is backing up on the conveyor device. It is in particular an object of the invention to provide means which minimize the risk of piece goods falling off the conveyor device and minimize the risk of a backup and al the same time enable access to the piece goods on the conveyor device.

The object of the invention is achieved by the features of the independent claims. Advantageous design embodiments are set forth in the dependent claims.

Accordingly, the object is achieved by a conveyor system comprising a conveyor device for transporting a piece goods item along a transport direction, and at least one guide member which has a base area and a first lateral face, wherein the conveyor device has a conveyor surface for the piece goods item and a lateral peripheral region which in the transport direction is disposed so as to be lateral to the conveyor surface, wherein the first lateral face conjoint with the base area configured as an internal angle of intersection of less than 90 degrees, wherein the guide member is disposed and/or designed in such a manner that at least part of the base area thereof is on the lateral peripheral region, and that a normal vector of the first lateral face, counter to the transport direction, points obliquely toward a center of the conveyor surface.

Moreover, the object is achieved by the use of a guide member in a conveyor device for displacing a piece goods item, which by the conveyor device on a conveyor surface is transported along a transport direction, toward a center of the conveyor surface, wherein the conveyor device has a lateral peripheral region disposed so as to be lateral to the conveyor surface, wherein the guide member has a base area and a first lateral face, wherein the first lateral face conjoint with the base area configured as an internal angle of intersection of less than 90 degrees, and wherein the guide member is designed in such a manner that, when disposing at least part of the base area thereof on the lateral peripheral region, a normal vector of the first lateral face of the guide member, counter to the transport direction, points obliquely toward the center of the conveyor surface.

The core concept of the invention it is thus the conveyor system comprising the conveyor device and the specifically designed guide member, as well as the use of the guide member in the conveyor device. The guide member comprises the base area and the first, preferably planar, lateral face and enables that piece goods which are transported by the conveyor device, as a result of an interaction with the guide member carry out a movement in the direction of the center of the conveyor surface. In this way the risk of piece goods falling off the conveyor device is minimized in a simple manner. Furthermore, the guide member minimizes the risk of piece goods remaining on the lateral peripheral region of the conveyor device and in this way cause a backup, in that the piece goods as a result of an interaction with the guide member are moved in the direction of the center of the conveyor surface. In this way, the piece goods can be transported onward by way of the conveyor surface such that the risk of a backup is highly minimized. Moreover, access to the piece goods that are transported by the conveyor device continues to be readily possible. The guide member has the particular advantage that said guide member can also be installed in a cost-effective manner in the case of already existing conveyor devices.

The first lateral face is preferably adjacent to the base area of the guide member. As a result of the first lateral face of the guide member conjointly with the base area comprising an internal angle of intersection of less than 90 degrees, and that the guide member is disposed and; or designed in such a manner that at least part of the base area thereof is on the lateral peripheral region, an angle of intersection of more than 90 degrees preferably results between the first lateral face of the guide member and the conveyor surface on which the piece goods are able to be transported. The internal angle of intersection is understood to mean the angle of intersection between the first, preferably planar, lateral face and the plane of the base area in the interior of the guide member, or when the first lateral face and the base area are not directly adjacent to one another, the angle of intersection between the plane of the first, preferably planar, lateral face and the plane of the base area measured on the side of the guide member. In other words, the guide member is thus designed in such a manner that, when at least part of the base area of said guide member is disposed on the lateral peripheral region, the first lateral face is not perpendicular to the conveyor surface but is inclined in relation to the latter. It is moreover provided that the guide member is disposed and/or designed in such a manner that the normal vector of the first, in particular planar, lateral face, counter to the transport direction, points obliquely toward the center of the conveyor surface. The center of the conveyor surface is preferably understood to mean a centerline of the conveyor surface that extends in the transport direction and has an identical spacing from both peripheries of the conveyor surface. In other words, the first lateral face of the guide member in the transport direction is thus preferably inclined obliquely toward the rear, away from the center. This leads to piece goods that are transported in the transport direction on the conveyor surface and are located close to the lateral peripheral region, while being pushed by the conveyor surface, as a result of an interaction with the guide member and in particular as a result of an interaction with the first lateral face of the guide member, carry out a movement in the direction of the center of the conveyor surface.

The conveyor device is preferably designed in such a manner that the lateral peripheral region is embodied at the same height as the conveyor surface and so as to be planar in relation to the latter. Furthermore preferably, the lateral peripheral region is preferably a region of the conveyor device that is not swept by the conveyor surface, particularly preferably the machine base of the conveyor device that is not swept by the conveyor surface. The conveyor device, in terms of the center of the conveyor surface, can have a lateral peripheral region on each of the two sides, or have a lateral peripheral region only on one side, of the conveyor surface.

In other words and in terms of an orthogonal coordinate system, the x-axis thereof being defined by the transport direction, the z-axis thereof being defined by the surface normal of the conveyor surface, and the y-axis thereof being perpendicular to the two aforementioned axes in such a manner that a right-handed orthogonal coordinate system results, the normal vector of the first lateral face preferably has a first vector component greater than zero in the negative x-direction, thus counter to the transport direction, a second vector component greater than zero in the positive or negative y-direction, and a third vector component greater than zero in the z-direction. Depending on whether the guide member on the lateral peripheral region is disposed to the left or to the right of the center of the conveyor surface, the vector component of the normal vector in the positive or negative y-direction is such that the normal vector points obliquely toward the center of the conveyor surface. In yet again other words, the normal vector of the first lateral face is thus preferably not parallel to the transport direction and also not perpendicular to the transport direction.

According to one preferred refinement of the invention, the guide member is designed in such a manner that a piece goods item transported by the conveyor device can slide onto the first lateral face of the guide member. Sliding on particularly preferably means a movement of the center of gravity of the piece goods item, said movement having a component parallel to the surface normal of the conveyor surface, thus parallel to the previously defined z-axis of the orthogonal coordinate system. For example, the piece goods item, while pushed by the conveyor surface and caused by the friction with the first lateral face of the guide member, can be erected on the first lateral face. In this way, the center of gravity of the piece goods item carries out a movement with a component parallel to the surface normal of the conveyor surface. In order to further simplify the action of the piece goods item sliding onto the first lateral face, it is furthermore preferably provided that the internal angle of intersection between the base area and the first lateral face of the guide member is preferably between 30 degrees and 85 degrees, particularly preferably between 50 degrees and 80 degrees, most particularly preferably between 60 degrees and 80 degrees. It is furthermore preferably provided that the internal angle of intersection is adapted to a transport speed and/or a weight of the piece goods transported by the conveyor device.

In this context, it is furthermore preferably provided that the normal vector of the first lateral face lies in a reference plane that is perpendicular to the conveyor surface and conjointly with the transport direction encloses an angle of 15 degrees to 80 degrees, preferably of 20 degrees to 70 degrees, particularly preferably of 25 degrees to 60 degrees. This further facilitates that the piece goods, as a result of an interaction with the guide member and in particular by sliding onto the first lateral face, carry out a movement toward the center of the conveyor surface.

According to one further preferred refinement of the invention it is provided that the guide member has a second, preferably planar, lateral face and is designed in such a manner that a normal vector of the second lateral face lies in the reference plane which is perpendicular to the conveyor surface and perpendicular to the transport direction. The reference plane for the normal vector of the second lateral face is thus preferably parallel to the yz-plane of the previously described right-handed orthogonal coordinate system. The second lateral face is preferably adjacent to the first lateral face of the guide member and furthermore preferably adjacent to the base area and to the first lateral face. Moreover, it is preferably provided that the guide member is designed in such a manner that, when at least part of the base area thereof is disposed on the lateral peripheral region, the second lateral face in the transport direction is next to the first lateral face. The described design embodiment of the second lateral face furthermore improves the function of the guide member in that piece goods that slide onto the first lateral face of the guide member can slide down along the second lateral face of the guide member and in this way are displaced in the direction of the center of the conveyor surface.

Furthermore preferably it is provided that the guide member has a third, preferably planar, lateral face and is designed in such a manner that the internal angle of intersection between the third lateral face and the base area is 90 degrees or less. The internal angle of the intersection between the third lateral face and the base area is preferably 90 degrees. The third lateral face is preferably adjacent to the first lateral face of the guide member and furthermore preferably adjacent to the base area and to the first lateral face. Moreover, it is preferably provided that the guide member is designed in such a manner that, when at least part of the base area thereof is disposed on the lateral peripheral region, the third lateral face is further away from the center of the transport surface than the second lateral face. The third lateral face is preferably parallel to the transport direction. This has the advantage that the guide member does not laterally project beyond a periphery of the conveyor device and in this way represents a risk of injury to persons working on the conveyor device.

In the context of the design embodiment of the base area, it is provided according to one further preferred refinement of the invention that a ratio between a longest line segment connecting two points of a delimitation line of the base area and the shortest line segment connecting two points on the delimitation line is equal to or less than 5. In other words, the guide member thus preferably does not have the shape of a lateral guide which has a large extent along the conveyor surface and is very long and narrow. Instead, the base area of the guide member has a shape of which the ratio between length and width, thus the ratio thereof between the longest line segment that connects two points on the delimitation line and the shortest line segment that connects two points on the delimitation line is equal to or less than 5, preferably equal to or less than 4, particularly preferably equal to or less than 3. Accordingly, the guide member does also not extend far along the conveyor surface. It is ensured in this way that access to the conveyor surface, and in this way also access to the piece goods transported by the conveyor surface, is not blocked by the guide member. Moreover, the guide member has a good stability by virtue of the ratio.

In this context, it is moreover preferably provided that the longest line segment that connects two points on the delimitation line is between 10 cm and 70 cm, preferably between 15 cm and 60 cm, particularly preferably between 20 cm and 55 cm in length, and/or that the shortest line segment that connects two points on the delimitation line is between 15 cm and 45 cm, preferably between 20 cm and 40 cm, particularly preferably between 25 cm and 35 cm in length.

In terms of the base area it is furthermore provided according to one preferred refinement of the invention that the base area of the guide member is a polygon, preferably a quadrangle. This has proven to be particularly suitable for the function of the guide member.

In this context, it is provided according to one further preferred refinement of the invention that the base area of the guide member is a trapezoid, that two mutually parallel base sides of the trapezoid are parallel to the transport direction of the conveyor device, and that the shorter base side of the trapezoid is closer to the center of the conveyor surface than the longer base side of the trapezoid. This enables in a simple manner that the Imide member by way of at least part of the base area thereof is disposed on the lateral peripheral region.

It is moreover preferably provided that the base area of the guide member is a rectangular trapezoid. A rectangular trapezoid, apart from two mutually parallel sides, has exactly 2 right internal angles and moreover two further internal angles, each having a value that differs from 90 degrees. In this context, it is furthermore preferably provided that the guide member by way of the base area thereof in the form of the rectangular trapezoid, is aligned in such a manner that the two right internal angles in the transport direction of the conveyor device are behind the two further internal angles of the trapezoid. In other words, it is provided according to one preferred refinement of the invention that the base area of the guide member is the rectangular trapezoid having the exactly 2 right internal angles, and that the two right internal angles in the transport direction are behind the further two internal angles of the trapezoid. This is a particularly simple possibility of ensuring that the normal vector of the first lateral face of the guide member, counter to the transport direction, points obliquely toward the center of the conveyor surface.

With a view to the design embodiment of the guide member it is provided according to one further preferred refinement of the invention that the guide member is a polyhedron, in particular a convex polyhedron. A polyhedron is a three-dimensional member which is delimited exclusively by planar surfaces. The polyhedron is convex when all points of a connecting line segment between two points of the member are likewise part of the member. In visual terms, it is thus preferably provided that the guide member does not have any concavities or indentations. A guide member configured as a polyhedron, and in particular as a convex polyhedron, is particularly easy to produce.

According to one further preferred refinement of the invention it is provided that the guide member is configured as a pyramid or as a truncated pyramid, particularly preferably as a truncated pyramid with a trapezoidal base area. This shape has proven particularly suitable in order to enable that the first lateral face conjointly with the base area has an internal angle of intersection of less than 90 degrees so as to enable that, when the guide body by way of at least part of the base area thereof is disposed on the lateral peripheral region, the normal vector of the first lateral face, counter to the transport direction, points obliquely toward the center of the conveyor surface.

In this context it is furthermore provided that the tip of the pyramid, or a virtual tip of the truncated pyramid, is above the base area of the guide member. This enhances the stability of the guide member, this being advantageous in particular for heavy piece goods.

With a view to a height of the guide member it is furthermore preferably provided that a height of the guide member, measured parallel to the surface normal of the base area, is between 5 cm and 50 cm, preferably between 10 cm and 40 cm, particularly preferably between 15 cm and 30 cm. This range has proven particularly advantageous for preventing piece goods from falling off.

As has already been mentioned, the guide member is disposed and/or designed in such a manner that at least part of the base area thereof is on the lateral peripheral region. In this context it is provided according to one preferred refinement that the guide member is designed and/or disposed in such a manner that the entire base area is on the lateral peripheral region. In this alternative, the base area of the guide member is thus completely disposed in the lateral peripheral region of the conveyor device. This facilitates the installation of the guide member.

In this context, it is provided as an alternative thereto according to one further preferred refinement of the invention that the guide member is designed and/or disposed in such a manner that a further part of the base area thereof is above the conveyor surface, that the further part of the base area is spaced apart from the conveyor surface, is configured so as to be friction-free in relation to the conveyor surface and/order in relation to the conveyor surface has a friction that does not compromise a conveying function of the conveyor device. In other words, part of the base area can be on the lateral peripheral region, and a further part of the base area of the guide member can be above the conveyor surface. This is particularly advantageous in the case of very narrow lateral peripheral regions. In the context of this alternative, it is moreover preferably provided that the part of the base area that is above the conveyor surface in relation to the conveyor surface has a minor friction, or preferably no friction at all such that the conveying function is not compromised. This can be achieved by way of a suitable choice of material, for example, and/or in that the further part of the base area is spaced apart from the conveyor surface, for example in that a minor offset is present in the base area of the guide member.

In terms of the design embodiment of the conveyor device it is provided according to one preferred refinement that the conveyor device is a belt conveyor and preferably a telescopic belt conveyor. In the case of a belt conveyor, which is also referred to as a conveyor belt or a belt conveyor, the conveyor surface is formed by a belt and/or a ribbon. A telescopic belt conveyor moreover has the advantage that a conveyor length can be adjusted in a stepless manner.

As has a ready been mentioned, the conveyor system comprises at least one guide member. In this context it can preferably be provided that the conveyor system comprises a plurality of guide members. It is furthermore preferably provided that all guide members are designed in such a manner that the first lateral face of all guide members conjointly with the respective base area have an internal angle of intersection of less than 90 degrees, that all guide members are disposed and/or designed in such a manner that at least part of the respective base areas thereof is on the lateral peripheral region, and that the normal vectors of the first lateral faces of all guide members, counter to the transport direction, point obliquely toward the center of the conveyor surface.

In this context, it is moreover provided according to one preferred refinement of the invention that the conveyor system comprises a plurality of guide members, wherein the guide members on both sides of the center of the conveyor surface are disposed in such a manner that, in the direction perpendicular to the transport direction, no guide member is disposed opposite each guide member on the other side of the center. In other words, no two guide members in terms of the transport direction are disposed at the same location on the right and on the left of the center of the conveyor surface. In this way, bottlenecks are avoided when transporting the piece goods.

According to one further preferred refinement it is provided with a view to the disposal of the plurality of guide members that the guide members on both sides of the center of the conveyor surface are disposed so as to be uniformly mutually offset. It is thus preferably provided that the spacing between two guide members on one side of the center is identical for all guide members on that side, and furthermore preferably is also identical to the spacing between two respective successive guide members on the other side of the center. For example, the guide members are disposed at a spacing of 0.3 m, 0.5 m, 0.7 m, 1 m or 1.2 m along the conveyor surface. Moreover, the guide members on the one side of the center are preferably disposed in relation to the guide members on the other side of the center in such a manner that one guide member on one side is identically spaced apart from to mutually adjacent guide members on the other side.

BRIEF DESCRIPTION OF THE DRAWINGS

The invention will be explained in more detail hereunder with reference to the appended drawings and by means of preferred exemplary embodiments.

In the drawings.

DETAILED DESCRIPTION OF THE EXEMPLARY EMBODIMENTS

The exemplary embodiments described are merely examples which in the scope of the claims can be modified and/or enhanced in many ways, Each feature which is described in the context of a specific exemplary embodiment can be used individually or in combination with other features in any other exemplary embodiment. Each feature which is described in the context of an exemplary embodiment of a specific category can also be used in an analogous manner in the exemplary embodiment of another category.

Figure 1:
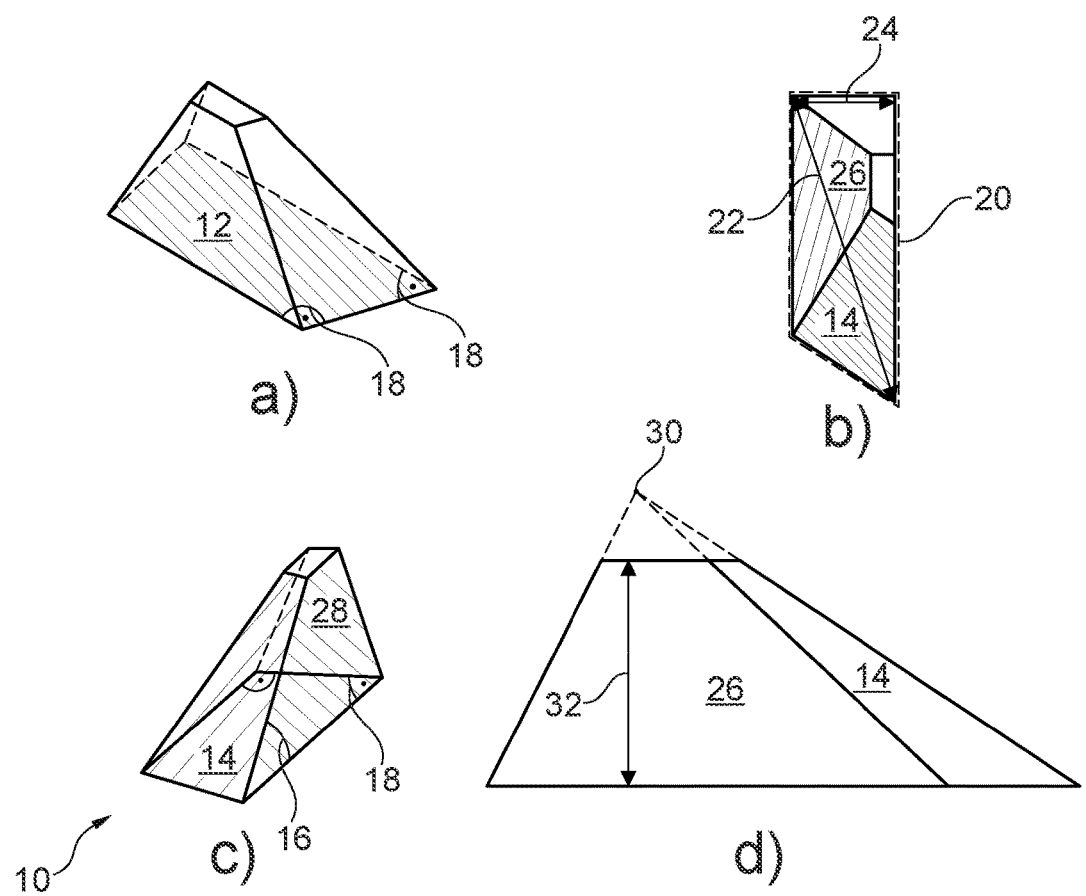
FIG. 1 shows schematic illustrations of a guide member from a plurality of perspectives, according to one exemplary embodiment of the invention.

FIG. 1 shows schematic illustrations of a guide member 10 from a plurality of perspectives, according to one exemplary embodiment of the invention. The guide member 10 in the present exemplary embodiment has the shape of a truncated pyramid, wherein a base area 12 of the guide member 10 is a trapezoid, this being particularly readily apparent in FIG. 1a). Moreover, the guide member 10 has a first, presently planar, lateral face 14, wherein the first lateral face 14 conjointly with the base area 12 has an internal angle of intersection 16 of less than 90 degrees, presently 65 degrees, which can best be seen in the perspective of FIG. 1c).

The trapezoidal base area 12 has two right internal angles 18, Moreover, the base area 12 of the guide member 10 is sized in such a manner that a ratio between a longest line segment 22 connecting two points on a delimitation line 20 of the base area 10 and a shortest line segment 24 connecting two points on the delimitation line 20 is less than or equal to 5. As can best be seen in FIG. 1b) the ratio between the longest line segment 22 and the shortest line segment 24 presently has the approximate value of 2. Moreover, the longest line segment 22 presently is 59 cm in length, and the shortest line segment 24 presently is 31 cm in length.

The guide member 10 moreover has a second lateral face 26 and a third lateral face 28, both being discussed at a later point. Moreover, the guide member designed as a truncated pyramid is shaped in such a manner that a virtual tip 30 of the truncated pyramid is above the base area 10. A height 32 of the guide member in the present exemplary embodiment is 23 cm.

Figure 2:
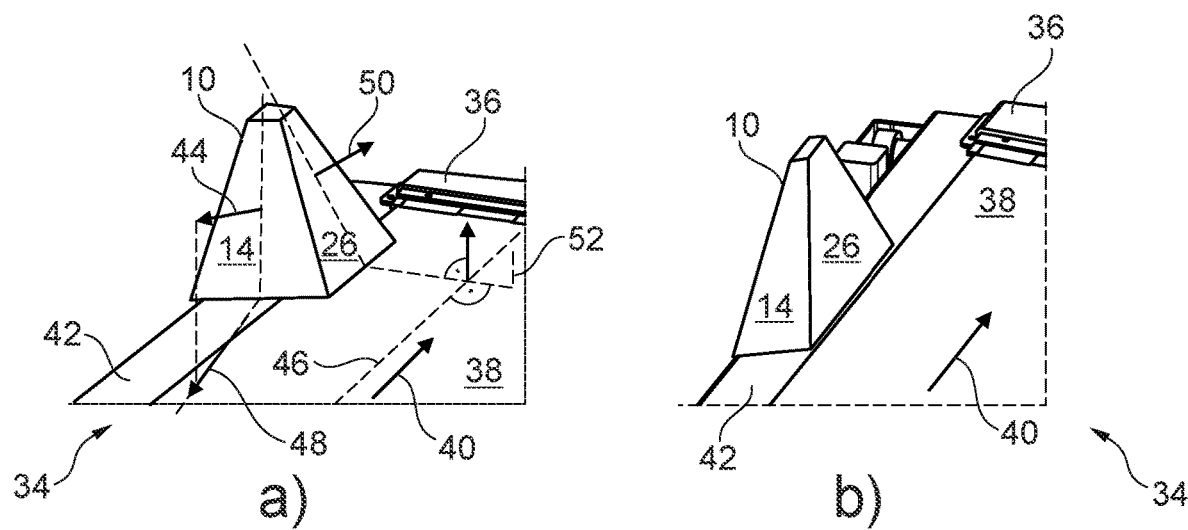
FIG. 2 shows schematic illustrations of a conveyor system comprising a conveyor device and a guide member, according to two further exemplary embodiments of the invention.

FIG. 2 shows two schematic illustrations of a conveyor system 34 comprising a conveyor device 36 and the guide member 10, according to two further exemplary embodiments of the invention. The conveyor device 36 in both exemplary embodiments shown is designed as a belt conveyor 36. The conveyor device 36 thus has a conveyor surface 38 which is designed as a belt and on which piece goods (not shown) can be transported in a transport direction 40. The conveyor device 36, lateral to the conveyor surface 38, has a lateral peripheral region 42. The lateral peripheral region 42 is not swept by the conveyor surface 38. The lateral peripheral region 42 is planar and designed so as to be at the same height as the conveyor surface 38.

In the exemplary embodiment of the conveyor system 34 shown in FIG. 2a) the guide member 10 is disposed in such a manner that part of the base area 10 thereof is on the lateral peripheral region 42, and a further part of the base area 10 thereof is above the conveyor surface 38. In the exemplary embodiment of the conveyor system 34 shown in FIG. 2b), the guide member 10 is disposed in such a manner that the entire base area 10 of the guide member 10 is on the lateral peripheral region 42.

It can moreover be seen in the exemplary embodiments in FIG. 2, in particular in FIG. 2a), that the guide member 10 is designed and/or disposed in such a manner that a normal vector 44 of the first lateral face 14, counter to the transport direction 40, points obliquely toward a center 46 of the conveyor surface 38. Moreover, for improved visualization, a projection 48 of the normal vector 44 onto the conveyor surface 38 is illustrated in FIG. 2a) so as to highlight the direction of the normal vector 44, counter to the transport direction 40, obliquely toward the center 46. It can likewise be seen that the guide member 10 is designed in such a manner that a normal vector 50 of the second lateral face 26 lies in a reference plane 52 which is perpendicular to the conveyor surface 38 and perpendicular to the transport direction 40.

The guide member 10 is thus designed in such a manner that a piece goods item transported by the conveyor device 36 can slide on to the first lateral face 14 of the guide member 10, and as a result of an interaction with the guide member 10 is displaced in the direction of the center 46 of the conveyor surface 38.

Figure 3:
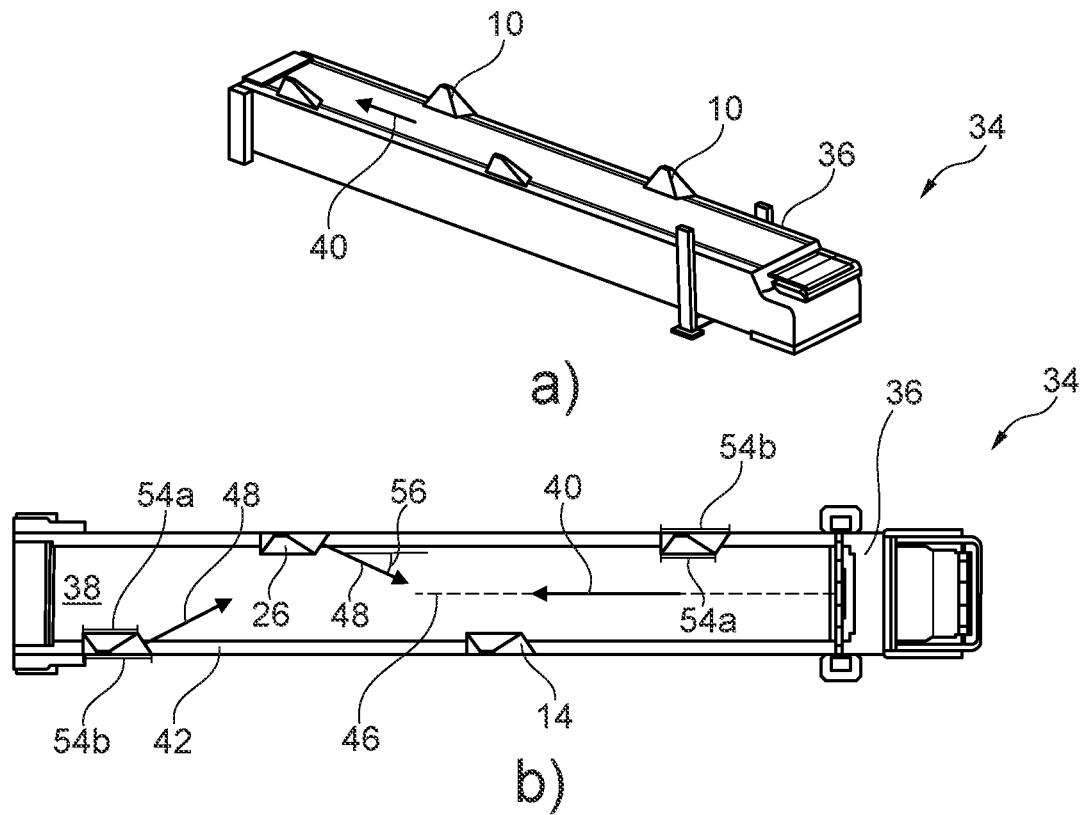
FIG. 3 shows schematic illustrations of a conveyor system from two perspectives, according to one further exemplary embodiment of the invention.

FIG. 3 shows two schematic illustrations of a conveyor system 34 from different perspectives, according to one further exemplary embodiment of the invention. In this exemplary embodiment, the conveyor system 34 has the conveyor device 36 for transporting piece goods along the transport direction 40, and a plurality of, presently four, guide members 10. It is readily apparent in particular in the perspective of FIG. 3a), which shows the conveyor system 34 from above, that two parallel base sides 54a, 54b of the base area 12, designed as a trapezoid, of the guide member 10 are parallel to the transport direction 40 of the conveyor device 36. Moreover, the shorter base side 54a is closer to the center 46 of the conveyor surface 38 than the longer base side 54b. It can furthermore be readily seen that the base area 12 is a rectangular trapezoid having exactly two right internal angles 18, and the two right internal angles 18 in the transport direction 40 are behind the further two internal angles of the trapezoid.

Moreover, plotted in FIG. 3b) is the projection 48 of the normal vector 44 of the first lateral face 14 onto the conveyor surface 38. It is particularly evident here that the angle 56 between the projection 48 of the normal vector 44 and the transport direction 40 in this exemplary embodiment is 30 degrees.

In the perspective from above it is likewise readily apparent that the lateral peripheral region 42 here is present on both sides of the center 46, and the guide members 10, in a manner analogous to that of FIG. 2a), each by way of part of the base area 12 thereof are on the lateral peripheral region 42 and each by way of a further part of the base area 12 are above the conveyor surface 38. Moreover, the guide members 10 on both sides of the center 46 of the conveyor surface 38 are disposed in such a manner that, in the direction perpendicular to the transport direction 40, no guide member 10 is disposed opposite each guide member 10 on the other side of the center 46. Moreover, the guide members 10 here are disposed so as to be uniformly offset.

Figure 4:
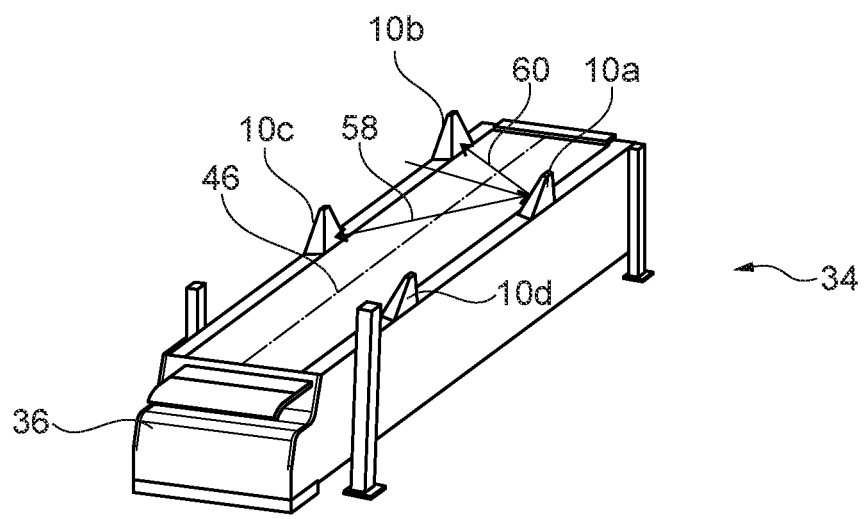
FIG. 4 shows a schematic illustration of a conveyor system, according to one further exemplary embodiment of the invention.

FIG. 4 shows a further schematic illustration of a conveyor system 34, according to one further exemplary embodiment of the invention. In this exemplary embodiment the conveyor system 34 has the conveyor device 36 and a plurality of, presently likewise four, guide members 10a, 10b, 10c, 10d. The guide members 10, in a manner analogous to that of FIG. 2b), each by way of the entire base area 12 thereof are disposed on the lateral peripheral region 42. Moreover, the guide members 10, in a manner analogous to that of FIG. 3, on both sides of the center 46 of the conveyor surface 38 are disposed in such a manner that, in the direction perpendicular to the transport direction 40, no guide member 10 is disposed opposite each guide member 10 on the other side of the center 46. It is thus highlighted in FIG. 4 that no guide member 10 is disposed opposite the guide member 10a, As opposed to the exemplary embodiment shown in FIG. 3, the guide members in FIG. 4 are however not disposed so as to be uniformly offset. This is because a distance 58 between the guide member 10a and the guide member 10c is larger than a distance 60 between the guide member 10a and the guide member 10b, as can be seen.

LIST OF REFERENCE SIGNS

Guide member 10
Base area 12
First lateral face 14
Internal angle of intersection 16
Right internal angle 18
Delimitation line of the base area 20
Longest line segment connecting two points on the delimitation line 22
Shortest line segment connecting two points on the delimitation line 24
Second lateral face 26
Third lateral face 28
Virtual tip 30
Height of the truncated pyramid 32
Conveyor system 34
Conveyor device, belt conveyor 36
Conveyor surface, belt 38
Transport direction 40
Lateral peripheral region 42
Normal vector of the first lateral face 44
Center of the conveyor surface 46
Projection of the normal vector onto the conveyor surface 48
Normal vector of the second lateral face 50
Reference plane 52
Base side 54
Angle between the projection of the normal vector and the transport direction 56
Distance between guide members 10a and 10c 58
Distance between guide members 10a and 10b 60

The invention claimed is:

1. Conveyor system comprising a conveyor device for transporting a piece goods item along a transport direction, and at least one guide member which has a base area and a first lateral face,
wherein the conveyor device has a conveyor surface for the piece goods item, and a lateral peripheral region which in the transport direction is disposed so as to be lateral to the conveyor surface;
wherein the first lateral face conjointly with the base area configures an internal angle of intersection of less than 90 degrees; and
wherein the guide member is disposed and/or designed in such a manner that at least part of the base area thereof is on the lateral peripheral region, and that a normal vector of the first lateral face, counter to the transport direction, points obliquely toward a vertical plane along a centerline of the conveyor surface;

wherein the base area of the guide member is a trapezoid, and wherein two mutually parallel base sides of the trapezoid are parallel to the transport direction of the conveyor device, and the shorter base side of the trapezoid is closer to the centerline of the conveyor surface than the longer base side of the trapezoid.

2. Conveyor system according to claim 1, wherein the guide member is designed in such a manner that a piece goods item transported by the conveyor device can slide onto the first lateral face of the guide member.

3. Conveyor system according to claim 1, wherein the guide member has a second lateral face and is designed in such a manner that a normal vector of the second lateral face lies in a reference plane which is perpendicular to the conveyor surface and perpendicular to the transport direction.

4. Conveyor system according to claim 1, wherein a ratio between a longest line segment connecting two points of a delimitation line of the base area and a shortest line segment connecting two points on the delimitation line is equal to or less than 5.

5. Conveyor system according to claim 1, wherein the base area of the guide member is a polygon.

6. Conveyor system according to claim 1, wherein the trapezoid is a rectangular trapezoid having exactly two right internal angles, and wherein the two right internal angles in the transport direction are behind two further internal angles of the trapezoid.

7. Conveyor system according to claim 1, wherein the guide member is a polyhedron, in particular a convex polyhedron.

8. Conveyor system according to claim 1, wherein the guide member is configured as a pyramid or as a truncated pyramid.

9. Conveyor system according to claim 1, wherein the guide member is designed and/or disposed in such a manner that the entire base area is on the lateral peripheral region.

10. Conveyor system according to claim 1, wherein the guide member is designed and/or disposed in such a manner that a further part of the base area thereof is above the conveyor surface, and wherein the further part of the base area is spaced apart from the conveyor surface, is configured so as to be friction-free in relation to the conveyor surface and/or in relation to the conveyor surface has a friction that does not compromise a conveying function of the conveyor device.

11. Conveyor system according to claim 1, wherein the conveyor device is a belt conveyor.

12. Conveyor system according to claim 1, comprising a plurality of guide members, wherein the guide members on both sides of the centerline of the conveyor surface are disposed in such a manner that, in the direction perpendicular to the transport direction, no guide member is disposed opposite each guide member on the other side of the centerline.

13. Conveyor system according to claim 12, wherein the guide members on both sides of the centerline of the conveyor surface are disposed so as to be uniformly mutually offset.

14. Use of a guide member in a conveyor device for displacing a piece goods item, which by the conveyor device on a conveyor surface is transported along a transport direction, toward a centerline of the conveyor surface;

wherein the conveyor device has a lateral peripheral region disposed so as to be lateral to the conveyor surface;

wherein the guide member has a base area and a first lateral face;

wherein the first lateral face conjointly with the base area configures an internal angle of intersection of less than 90 degrees;

and wherein the guide member is designed in such a manner that, when disposing at least part of the base area thereof on the lateral peripheral region, a normal vector of the first lateral face of the guide member, counter to the transport direction, points obliquely toward a vertical plane along the centerline of the conveyor surface;

wherein the base area of the guide member is a trapezoid, and wherein two mutually parallel base sides of the trapezoid are parallel to the transport direction of the conveyor device, and the shorter base side of the trapezoid is closer to the centerline of the conveyor surface than the longer base side of the trapezoid.

* * * * *